United States Patent [19]

Wende

[11] 3,975,233

[45] Aug. 17, 1976

[54] NEUTRONIC REACTOR

[75] Inventor: Charles W. J. Wende, West Chester, Pa.

[73] Assignee: The United States of America as represented by the United States Energy Research and Development Administration, Washington, D.C.

[22] Filed: Sept. 10, 1952

[21] Appl. No.: 308,768

[52] U.S. Cl. .............................. 176/86 R; 1.76/87
[51] Int. Cl.² .......................................... G21C 7/10
[58] Field of Search ................. 204/154.2; 250/108; 176/86, 87

[56] References Cited
UNITED STATES PATENTS

| | | | |
|---|---|---|---|
| 2,183,790 | 12/1939 | Dillehay et al. | 250/108 |
| 2,287,620 | 6/1942 | Kallmann et al. | 250/108 |
| 2,405,987 | 8/1946 | Arnold | 250/108 |
| 2,550,367 | 4/1951 | Meier | 250/108 |
| 2,708,656 | 5/1955 | Fermi et al. | 204/193 |
| 2,716,705 | 8/1955 | Linn | 204/193 |
| 2,719,823 | 10/1955 | Linn | 250/83.6 |
| 2,727,996 | 12/1955 | Rockwell et al. | 204/193 |

OTHER PUBLICATIONS

Physical Review Aug. 1, 1935, vol. 48 pp. 265–280.
Physical Review July 1, 1947, vol. 72 No. 1 pp. 16–23.
Sourcebook on Atomic Energy by Samuel Glasstone Publ. by D. Van Nostrand Co., N.Y. 1950 pp. 390–391.
Atomics vol. 6 Nov.–Dec. 1950 pp. 10–16.
AECD–3435 by W. M. Breazeale Apr. 15, 1952 pp. 4–15.

*Primary Examiner*—Harvey E. Behrend
*Attorney, Agent, or Firm*—Dean E. Carlson; Arthur A. Churm; Marshall Burmeister

[57] ABSTRACT

A safety rod for a nuclear reactor has an inner end portion having a gamma absorption coefficient and neutron capture cross section approximately equal to those of the adjacent shield, a central portion containing materials of high neutron capture cross section and an outer end portion having a gamma absorption coefficient at least equal to that of the adjacent shield.

4 Claims, 5 Drawing Figures

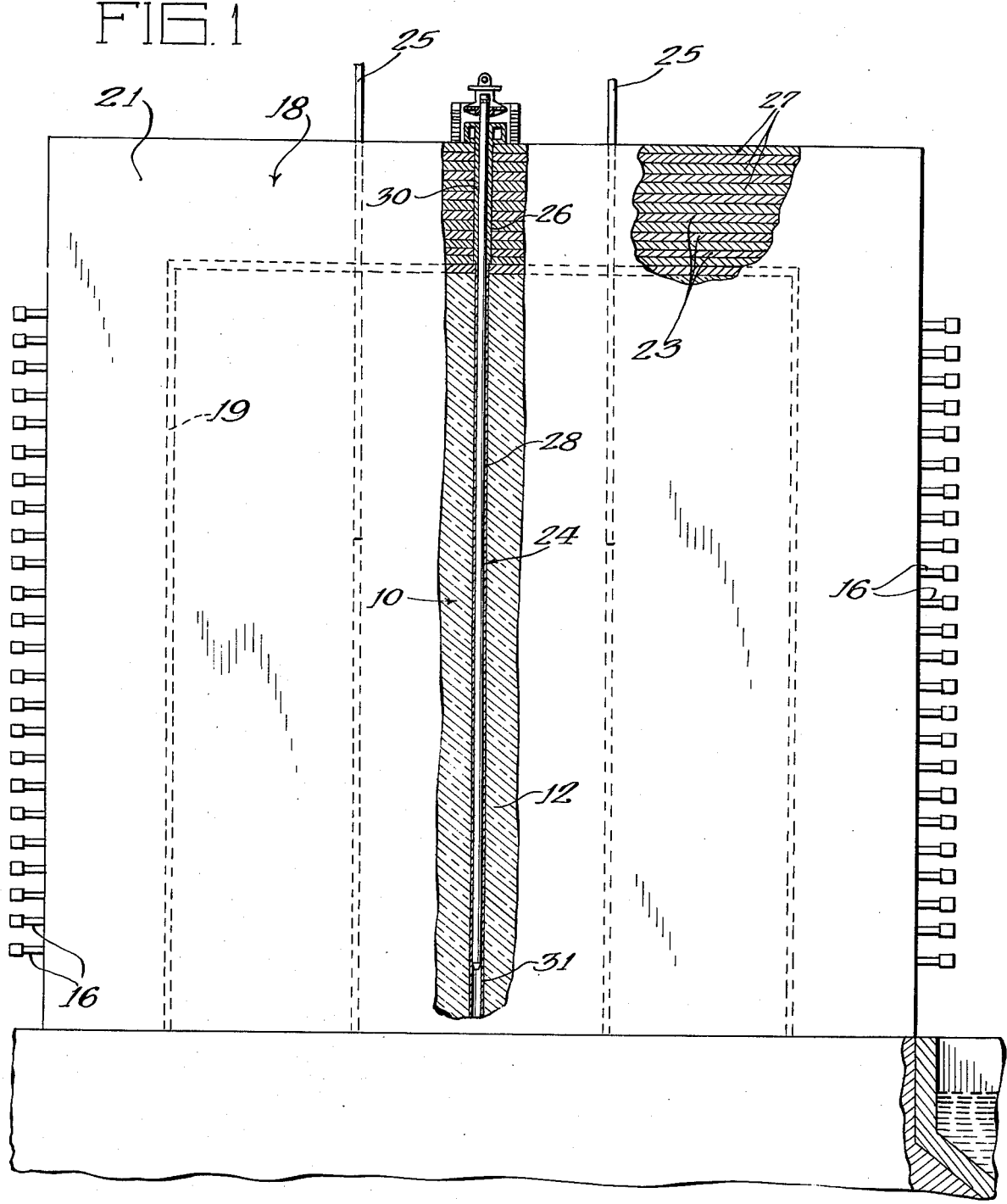

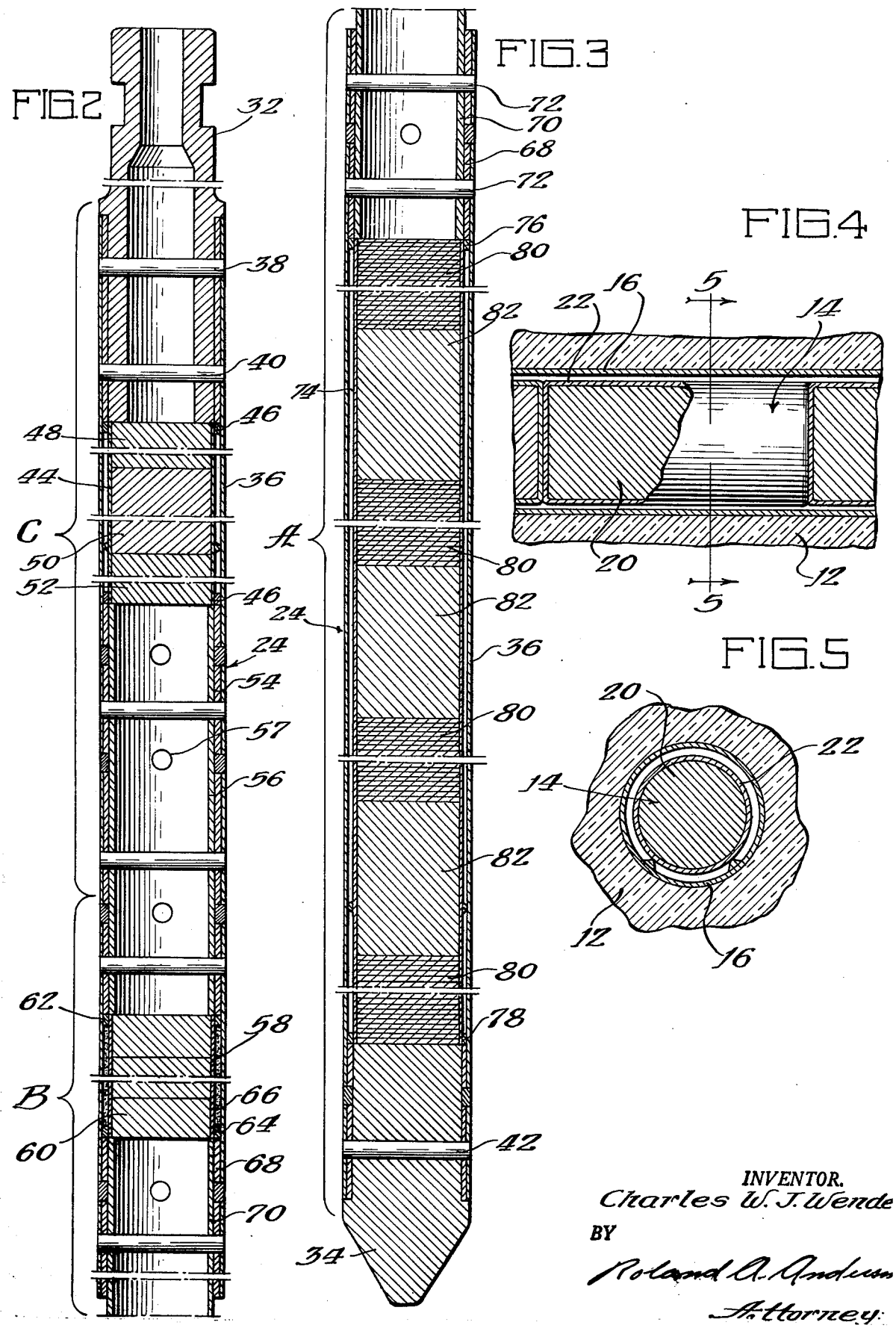

NEUTRONIC REACTOR

The present invention relates to neutronic reactors, and to neutron absorbing control elements for neutronic reactors.

Structures capable of neutronic reactions produce either converging or diverging reactions, that is, the neutron flux density within the structures either increases or decreases with the passage of time. Structures which converge will not sustain a neutronic chain reaction, the reaction merely dying out as a result of the absorption of neutrons in the structure and leakage from the structure. However, a diverging neutronic chain reaction is self-sustaining and will increase exponentially as long as the structure remains physically unchanged.

One of the methods used in the art to control diverging neutronic chain reactions is to insert an adjustable neutron absorbing element into the structure. Fermi et al. U.S. Patent No. 2,708,656, dated May 17, 1955, discloses neutronic reactors controlled by means of neutron absorbing elements positionable within the mass of the reactor structure.

Neutronic reactors are generally provided with a radiation and particle shield disposed thereabout in order to protect operating personnel from injurious radiations emanating from the reactor. If a control element is to be positionable within the structure of the reactor, it is generally necessary that the control element pierce the shield surrounding the active portion of the reactor. However, apertures in the shield provide a pathway of escape for neutrons and other radiations and often necessitate additional shielding for the reactor. Hence, it is an object of the present invention to provide a neutronic reactor with neutron absorbing elements for controlling the reaction which pierce the shield of the reactor and minimize the amount of neutrons and other radiations escaping from the apertures in the shield.

Most neutronic reactors which are controlled by neutron absorbing elements, are provided with at least two types of neutron absorbing elements. The neutron absorbing elements are often in rod form and are designated "safety rods" and "control rods". Both types of control elements are constructed of neutron absorbing materials and are intended to retard the neutronic chain reaction, but the "control rods" are positionable to provide control for small variations in neutron flux density within the reactor, and the "safety rods" are positionable to control large changes in the neutron flux density within the reactor, or solely for the purpose of starting and stopping the reactor. The present invention is also directed to providing "safety rods" which minimize the escape of radiations through the apertures in the radiation shield, although it may be utilized with "control rods" also.

A more complete understanding of the present invention may be had by a further reading of the present disclosure, taken in the light of the drawings, in which:

FIG. 1 is a front elevational view, partly cut away and in section, of a neutronic reactor constructed in accordance with the present invention;

FIG. 2 is an elongated sectional view of a portion of the control element shown in FIG. 1;

FIG. 3 is a sectional view of the remainder of the control element shown in FIG. 1;

FIG. 4 is a sectional view of a fragment of the neutronic reactor shown in FIG. 1 showing the fuel elements for the reactor; and FIG. 5 is a sectional view taken along line 5—5 of FIG. 4.

The neutronic reactor illustrated in FIG. 1 has an active portion 10 with a neutron moderator 12 and fuel elements 14. The active portion of a reactor may be defined as the portion of the structure in which the fissionable material is disposed and in which the multiplication of neutrons occurs. The fuel elements 14 are disposed within tubes 16 which traverse the active portion 10 of the reactor. A radiation shield 18 surrounds the active portion 10 of the reactor.

The fuel elements 14 are provided with bodies 20 of material fissionable by neutrons of thermal energy. The bodies 20 are surrounded by protective jackets 22 which are constructed of material having small neutron capture cross sections. It has been found that natural uranium, plutonium, U235, and U233 are suitable materials for the body 20 of the fuel elements 14, and that the protective jackets 22 may be constructed of aluminum or zirconium.

The moderator 12 may be constructed of graphite, beryllium or other materials having suitable neutron moderating properties. It will be understood, that the present invention may be practiced with a neutronic reactor having any of the presently known constructions for its active portion, even though the reactor here illustrated operates primarily with neutrons of thermal energy. For a more complete discussion of neutronic reactors, reference is made to the aforementioned Fermi et al. patent.

The shield 18 surrounding the active portion 10 of the reactor includes a thermal shield 19 immediately adjacent to the active portion 10, and a biological shield 21. The thermal shield is primarily for straining out thermal neutrons and gamma rays, and the biological shield 21 reduces the emitted radiations from the reactor sufficiently to permit persons to work in the vicinity of the reactor.

Since the shield 18 must shield against both neutrons and gamma rays, it is preferably a composite shield, that is, a shield containing one material which absorbs thermal neutrons and gamma rays and another material which reduces the energy of the neutron flux to a more readily absorbable level. It is to be noted, that a shield solely for the purpose of absorbing neutrons is preferably a composite shield, since it should slow fast neutrons, absorb thermal neutrons, and in addition, absorb gamma radiations given off by the absorption of neutrons.

It has been found that the thermal shield 19 may be constructed of iron, and that a ten inch thickness of iron will reduce the emerging energy from the active portion 10 of the reactor by about 97 percent.

The biological shield 21 is constructed of alternate layers of neutron slowing material 27, and gamma ray and neutron absorbing material 23. The copending patent application of Enrico Fermi and Walter H. Zinn, Ser. No. 641,625, filed Jan. 16, 1946, now U.S. Pat. No. 2,807,727, dated Sept. 24, 1957 describes such a shield. It has been found that a good material for slowing neutrons is "masonite" (a pressed wood product having a density of 1.3 and a hydrogen content of about 6 percent) and a good material for absorbing gamma rays and neutrons is iron. The layers of "masonite" 27 are alternated with layers of iron 23, the "masonite"

layers being approximately 4½ inches thick and the iron layers 3¾ inches thick, the total thickness of the biological shield 21 being 49⅓ inches.

Other materials could equally well be used for the thermal shield 19, and the biological shield 21. An example of the effectiveness of shielding materials may be had from the following table:

| Material | Thickness in Inches Required for Ten Fold Reduction in Intensity | | |
|---|---|---|---|
| | 2 Mev Gamma Rays | Thermal Neutrons | Fast Neutrons |
| Water | 20 | 2 | ~4 |
| Masonite | 15 | 3 | ~8 |
| Graphite | 12 | 45 | ~15 |
| Concrete | 10 | 7 | ~17 |
| Iron | 2.6 | 1.3 | ~20 |
| Lead | 1.7 | 8 | — |

The laminated biological shield is preferably constructed with a material having a gamma ray absorption coefficient at least that of concrete and a thermal neutron absorption cross section of at least 100 barns for the neutron and gamma ray absorbing element. The neutron slowing element in the shield should have a slowing power of at least 0.1, that is, the neutron scattering cross section per unit volume times the average logarithmic energy loss per neutron collision should be 0.1, using the terminology of "Science and Engineering of Nuclear Power", edited by Clark Goodman.

As illustrated in FIG. 1, at least one safety rod 24 and control rods 25 extend into the active portion 10 of the reactor through apertures 26 in the reactor shield 18 and into channels 28 in the active portion 10 of the reactor. The safety rod 24 and the control rods 25 may be positioned by a mechanical drive, or by hand, but in any event the rods 24 and 25 are slidable within the channels 28 in the active portion 10 of the reactor. The apertures 26 in the shield 18 are provided with radiation absorbing liners 30 which also form a bearing for the rods 24 and 25, and sleeves 31 of materials having small neutron cross sections seal the reactor atmosphere from the channels 28.

The rod 24 has a head 32 and a tip 34, as shown in FIGS. 2 and 3. A tube 36 is secured to the head by means of pins 38 and 40 and extends to the tip 34 where it is secured by a pin 42. Neutronically, the rod 24 has three regions. The region adjacent to the tip 34, called the inner end portion, is a neutron and gamma ray absorbing region, illustrated as region A in the drawings. Adjacent to this region is a region of high neutron absorption, designated region B. Finally, the region adjacent to the head 32, called the outer end portion, is a region of high gamma ray absorption, designated region C.

In region C, an inner sleeve 44 is disposed within the tube 36 in contact on one end with the head 32, and is held in place by means of spacers 46 disposed between the tube 36 and the sleeve 44. A layer of discs 48 of material which slows neutrons adjacent to the head 32, a shield plug 50 constructed of gamma ray absorbing materials, and another layer of discs 52 of material that slows neutrons, disposed in that order, provide the high gamma ray absorption properties of region C.

Beneath the discs 52, a sleeve 54 is disposed in contactual relationship with the outer tube 36, and a spacer tube 56 is disposed within the sleeve 54. The interior of the spacer tube 56 is hollow, and orifices 57 admit the atmosphere existing in the channel 28 into the spacer tube 56.

The region of high neutron absorption B lies beneath this hollow region. Confronting the spacer 56 is a sleeve 58 containing a plurality of discs 60 of neutron slowing material. The sleeve 58 is spaced from the outer tube 36 by spacers 62 and 64. The space thus provided between the tube 36 and the sleeve 58 is filled with material 66 in powder form having a high neutron capture cross section.

The region immediately below the discs 60 is again a hollow region of the rod 24, and is constructed with an inner sleeve 68 and a spacer tube 70 disposed within the outer tube 36. A number of pins 72 extend through the rod in this and other regions in order to give the rod structural rigidity.

The region of high absorption of both gamma rays and neutrons, A, lies between this hollow region and the tip 34 of the rod 24. An inner sleeve 74 is disposed within the tube 36 and spaced therefrom by spacers 76 and 78. The region within the sleeve 74 is provided with alternate layers of discs 80 and shield plugs 82 disposed therebetween. The shield plugs 82 are constructed of materials having high thermal neutron capture cross sections and gamma ray absorption coefficients, and the discs 80 are constructed of materials having high neutron slowing powers. The tip 34 is affixed at the end of the rod adjacent to the last disc 80.

In a particular embodiment of the rod 24, the head 32 and the tip 34 are constructed of steel, as is the outer tube 36. Inner sleeves 44, 58 and 74 are constructed of aluminum. The total overall length of the rod 24 is 39 feet 9½ inches, the channel 28 in the reactor being approximately 40 feet long. The portion C of the rod 24 constructed of neutron and gamma ray absorbing materials including the head 32 extend approximately 11½ feet from the top of the rod, as shown in FIG. 2, the thickness of the reactor shield 18 which is traversed by the aperture 26 being approximately 5 feet. The portion A of the rod having gamma ray and neutron absorption properties similar to the shield 18, including the tip 34 extend approximately 9 feet in length, and the region B of predominantly neutron absorption being approximately 18½ feet long.

In this construction, the portion A of the safety rod 24 has both a neutron and a gamma ray absorption similar to those of the adjacent shield 18. There are many materials known to the man skilled in the art which will absorb neutrons and gamma rays, and it is also well known in the art to use laminated shields such as the type shown for region A in FIG. 3. However, it has been found that the region A of the rod 24 will have approximately the same neutron absorption properties and gamma ray absorption properties as the shield 18 set forth above, when constructed with shield plugs 82 consisting of materials having a total neutron absorption cross section of at least 2 barns and a gamma ray absorption coefficient at least as great as concrete, such as soft steel, and discs 80 consisting of materials having a neutron slowing power of at least 0.1, such as "masonite", in a laminated structure. Each of the shield plugs 82 is constructed in the form of a cylinder of soft steel 3¾ inches long, and the "masonite" discs 80 are 13½ inches adjacent to the tip 34 to 16½ inches at the opposite end of the region A.

In like manner, a region B of high neutron absorbing properties may be constructed of any of the well known neutron absorbers with a thermal neutron capture cross section of at least 100 barns, such as cadmium and boron. In the particular construction described above, boron in the form of powder 66 is used. A plurality of polyethylene discs 60 are disposed within the cylinder of boron powder 66, although other materials having a neutron slowing power of at least 0.1 could be used. Since boron powder is a better absorber of neutrons of thermal energy than other energies and the polyethylene discs are effective to slow neutrons, the neutrons passing through the polyethylene discs 66 are reduced in energy, and thus the probability of absorbing these neutrons in the boron powder is increased. The region B should be provided with as much neutron absorbing capabilities as possible, since the rod will then have its greatest effect.

The region C adjacent to the head of the rod 24 will reside only in the shield 18 when the rod 24 is fully inserted into the channel 28 in the active portion 10 of the reactor. Since the rod 24 has its greatest utility as a safety rod, rather than a control rod, it will attain this position only when the neutronic reactor is shut down, that is, when the generation of a divergent neutronic chain reaction has ceased. However, even in its shut-down condition, a considerable number of neutrons will be present in the active portion 10 of the reactor as a result of the decay of fission fragments and the emission of delayed neutrons. For this reason, the region C of the safety rod must shield against neutrons even though its primary function is to shield against gamma radiations emanating from the reactor. For this reason, the gamma radiation absorption properties of the region C are made similar to the gamma radiation absorption properties of the shield 18, but a lesser absorption is tolerated for neutrons. In the particular embodiment described above, a shield plug 50 is constructed of lead in the form of a cylinder approximately 6 inches in length. The adjacent discs 48 and 52 are constructed of polyethylene and are approximately 8 and 114 inches, respectively. The polyethylene discs 48 and 52 perform a dual function in that they absorb considerable quantities of gamma radiation as well as neutrons. In addition, considerable numbers of neutrons will be reflected back into the active portion 10 of the reactor by the polyethylene discs 48 and 52 where they will be absorbed since the reaction in the active portion 10 of the reactor is convergent.

It is apparent from the foregoing description, that the present invention has many other advantages and applications other than those specifically set forth herein. For example, the region A having neutron and gamma ray absorption properties similar to those of the reactor shield need not be disposed adjacent to the tip of the rod for rods normally partially inserted in the reactor during operation thereof, but may be disposed adjacent to the shield 18 in the normal operating position. For this reason, it is intended that the scope of the present invention be not limited by the specific disclosure herein, but rather only by the appended claims.

What is claimed is:

1. A safety rod for a neutronic reactor comprising an elongated hollow tube, a first region approximately nine feet in length comprising a plurality of spaced layers of "masonite" disposed within the tube adjacent to one end thereof, and a layer of soft steel disposed within the tube between each pair of spaced layers of masonite, a second region adjacent to the first region comprising a sleeve disposed within the tube having a smaller outer diameter than the inner diameter of the tube forming a space between the sleeve and the tube, powdered boron disposed within said space, and a plurality of discs of polyethylene disposed within the sleeve, and a third region approximately eleven and one-half feet in length adjacent to the second region comprising a lead plug within the tube and discs of polyethylene adjacent to both sides of the plug.

2. A neutronic reactor comprising, in combination an active portion containing material fissionable by neutrons of thermal energy provided with a channel therein adapted to receive a neutron absorbing rod, a radiation shield surrounding the active portion of the reactor having an aperture aligned with said channel, said shield having an iron thermal shield approximately 10 inches thick surrounded by a laminated biological shield approximately 49⅓ inches thick, said biological shield having alternate layers of "masonite" approximately 4½ inches thick and iron approximately 3¾ inches thick, a neutron absorbing rod slidably disposed within the channel and aperture in the shield, said rod having an inner end portion approximately 9 feet in length containing layers of "masonite" approximately 13½ inches long and layers of soft steel approximately 3¾ inches long, and said rod having an outer end portion approximately 11½ feet long containing a lead cylinder approximately 6 inches in length and two abutting polyethylene discs, the disc between the lead cylinder and the outer end of the rod being approximately 8 inches in length, and the other disc being approximately 114 inches in length.

3. A neutronic reactor having an active portion provided with a channel therein adapted to receive a neutron absorbing rod, a radiation shield surrounding the active portion of the reactor and having an aperture aligned with said channel, and a neutronic absorbing rod slidably disposed within said channel characterized by the construction wherein the rod comprises an inner end portion at least equal in length to the thickness of the shield and normally positioned within said aperture, said inner end portion having a neutron capture cross section and a gamma ray absorption coefficient at least equal to those of the surrounding shield, a central portion having an axial portion containing material having a neutron slowing power of at least 0.1 and a peripheral portion containing material having a neutron capture cross section of at least 100 barns, and an outer end portion at least equal in length to the thickness of the shield and having a gamma ray absorption coefficient at least as great as that of the shield.

4. A neutronic reactor comprising the elements of claim 3 wherein the neutron absorbing material in the central portion of the neutron absorbing rod comprises boron, and the neutron slowing material comprises polyethylene.

* * * * *